(12) United States Patent
Yang

(10) Patent No.: US 7,116,565 B1
(45) Date of Patent: Oct. 3, 2006

(54) OVER-POWER PROTECTION APPARATUS FOR SELF-EXCITED POWER CONVERTER

(75) Inventor: Ta-Yung Yang, Milpitas, CA (US)

(73) Assignee: System General Corp., Taipei (TW)

( * ) Notice: Subject to any disclaimer, the term of this patent is extended or adjusted under 35 U.S.C. 154(b) by 0 days.

(21) Appl. No.: 11/209,822

(22) Filed: Aug. 24, 2005

(51) Int. Cl.
*H02M 3/335* (2006.01)
*H02M 7/538* (2006.01)
*H02H 7/122* (2006.01)

(52) U.S. Cl. .................. 363/24; 363/56.08; 363/134
(58) Field of Classification Search .............. 363/24, 363/25, 26, 133, 134, 56.06, 56.07, 56.08; 323/901
See application file for complete search history.

(56) References Cited

U.S. PATENT DOCUMENTS 5,910,709 A * 6/1999 Stevanovic et al. ......... 315/225
6,259,615 B1 * 7/2001 Lin ............................. 363/98
6,954,364 B1 * 10/2005 Min ........................ 363/56.08
7,042,740 B1 * 5/2006 Morimoto et al. ........... 363/24

\* cited by examiner

*Primary Examiner*—Bao Q. Vu
(74) *Attorney, Agent, or Firm*—Rosenberg, Klein & Lee (57) ABSTRACT

An over-power protection apparatus for self-excited power converter comprises a soft-start unit, an adjusting unit and a timing unit. A PWM unit of the self-excited power converter generates a switching signal in response to a compensating signal of the soft-start unit to control the output power of the self-excited power converter. The soft-start unit couples to the adjusting unit. The adjusting unit drives the soft-start unit and the PWM unit for modulating the switching signal to reduce the pulse width of the switching signal and the output power of the self-excited power converter once the short-circuit and over-load are happened at the output of the self-excited power converter. In the meantime, a timing unit starts to count. The timing unit drives the self-excited power converter to stop supplying the power source after the counting and the over-power lasting for a period of time.

9 Claims, 10 Drawing Sheets

OVER-POWER PROTECTION APPARATUS FOR SELF-EXCITED POWER CONVERTER

BACKGROUND OF INVENTION

1. Field of the Invention

The present invention relates to an over-power protection circuit, and more specifically, to an over-power protection circuit for self-excited power converter.

2. Description of Related Art

Figure 1:
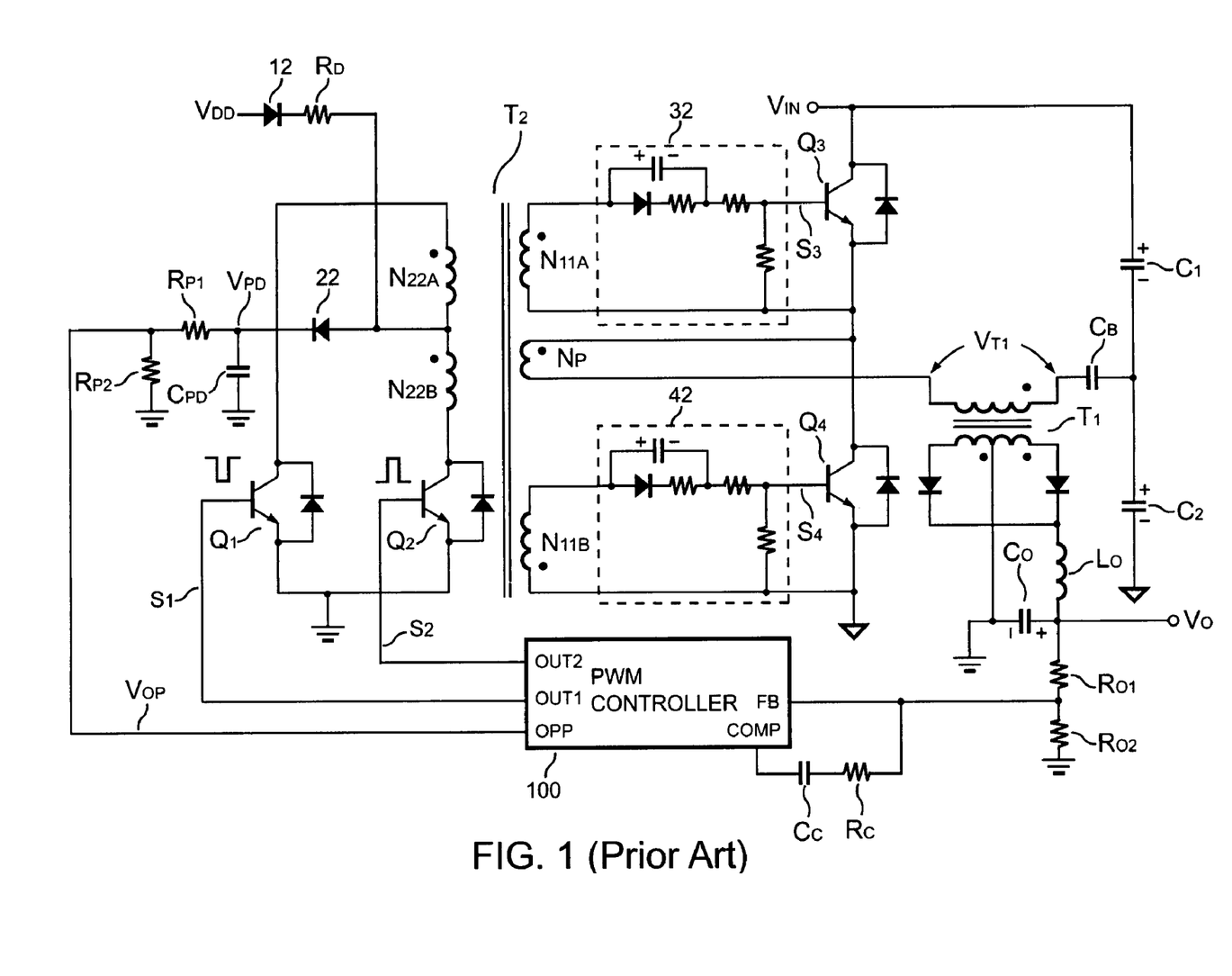
FIG. 1 shows a schematic circuit diagram of conventional self-excited half-bridge power converter.

Various self-excited power converters have been widely used in desktop computers for providing regulated voltage and current. The self-excited half-bridge power converter is a main application circuit in the field of the self-excited power converter. FIG. 1 illustrates the topology of a conventional self-excited half-bridge power converter composed of a primary-side circuit, a main transformer $T_1$, a secondary-side circuit, an over-power detecting circuit and a driving transformer $T_2$. The primary-side circuit comprises a regulating capacitor $C_1$, a regulating capacitor $C_2$, an upper power transistor $Q_3$, an upper driving circuit 32, a lower power transistor $Q_4$, a lower driving circuit 42 and a blocking capacitor $C_B$. The secondary-side circuit comprises an output inductor $L_O$, an output capacitor $C_O$, a voltage divider $R_{O1}$ and $R_{O2}$, a PWM (Pulse Width Modulation) controller 100 and a compensating network having a compensating resistor $R_C$ as well as a compensating capacitor $C_C$. The over-power detecting circuit consists of a filtering diode 22, a filtering capacitor $C_{PD}$, a voltage divider $R_{P1}$ and $R_{P2}$.

In the self-excited half-bridge power converter, the bipolar transistors (the upper power transistor $Q_3$ and the lower power transistor $Q_4$) with feature of high voltage are used as a power switch while the upper power transistor $Q_3$ and the lower power transistor $Q_4$ are driven by a self-excited driving way. Therefore the energy stored in the primary side is delivered to the output of the self-excited half-bridge power converter through the main transformer $T_1$. The driving transformer $T_2$ having the current transformer behavior achieves the self-excited driving. This driving method is also called the proportional drive.

Figure 2A:
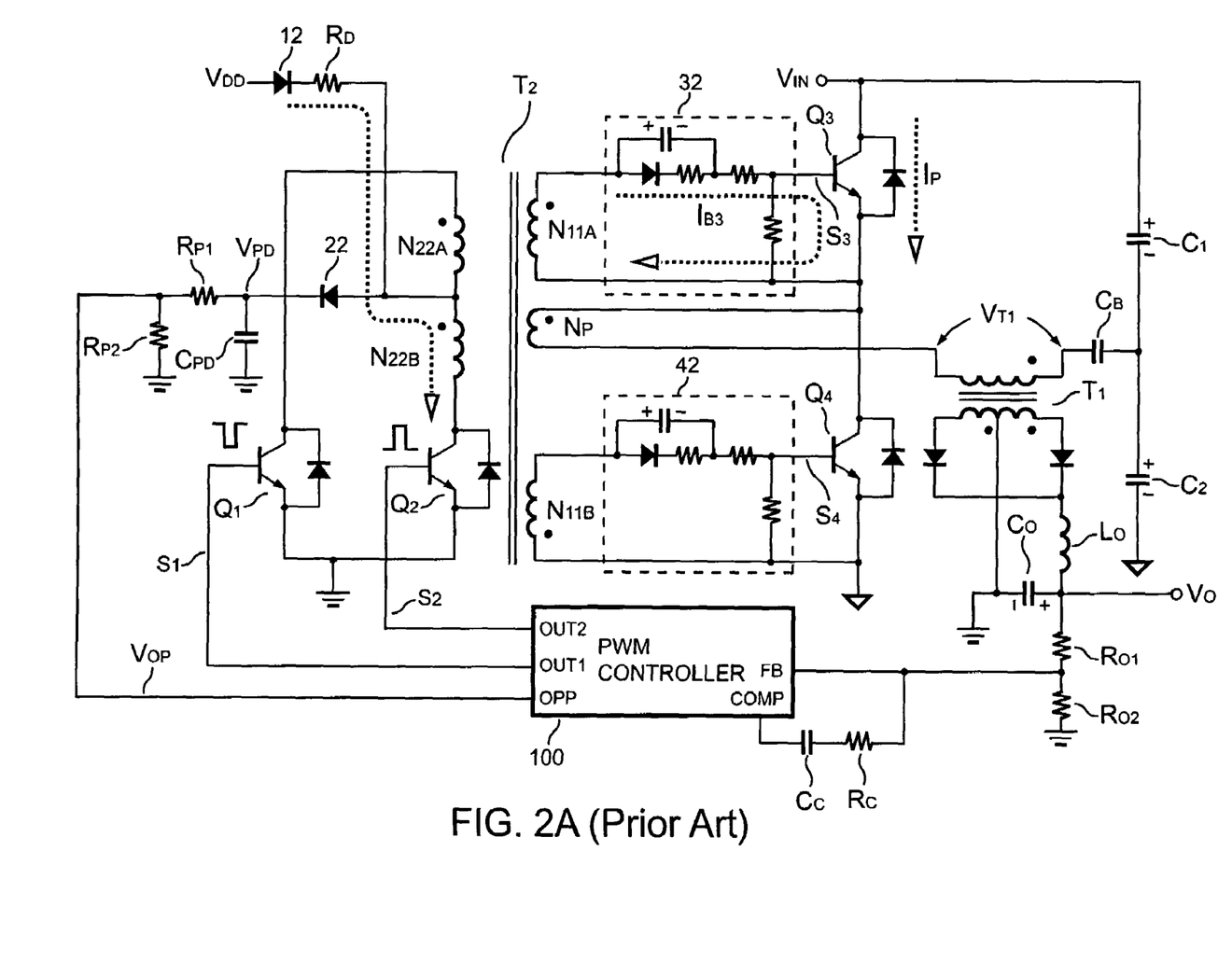
FIG. 2A shows a schematic circuit diagram of conventional self-excited half-bridge power converter during start-up.
Figure 3:
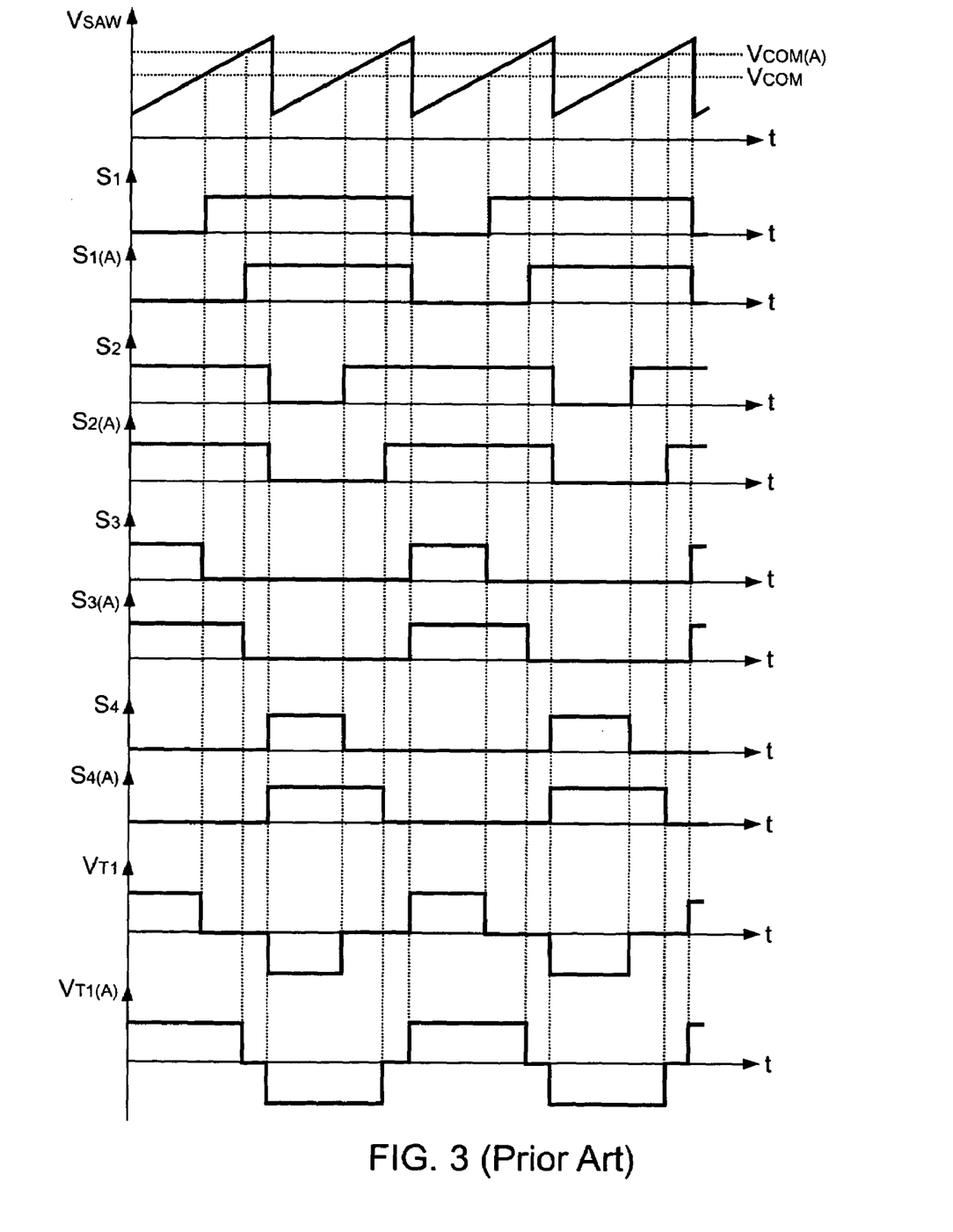
FIG. 3 shows a waveform of conventional self-excited half-bridge power converter.

FIG. 2A illustrates a schematic diagram of conventional self-excited half-bridge power converter during start-up. Referring to FIG. 3, a PWM controller 100 generates a high-level switching signal $S_2$ to turn on a transistor $Q_2$. A supply voltage $V_{DD}$ charges the winding $N_{22B}$ of the driving transformer $T_2$ through a diode 12 and a resistor $R_D$. Due to the same polarity of the winding $N_{22B}$ and $N_{11A}$, the winding $N_{11A}$ induces a positive voltage so as to produce a base current $I_{B3}$. The primary-side current $I_P=h_{fe}\times I_{B3}$ is generated because the base current $I_{B3}$ is amplified by the power transistor, wherein the $h_{fe}$ is especially the current gain of the upper power transistor $Q_3$.

Figure 2B:
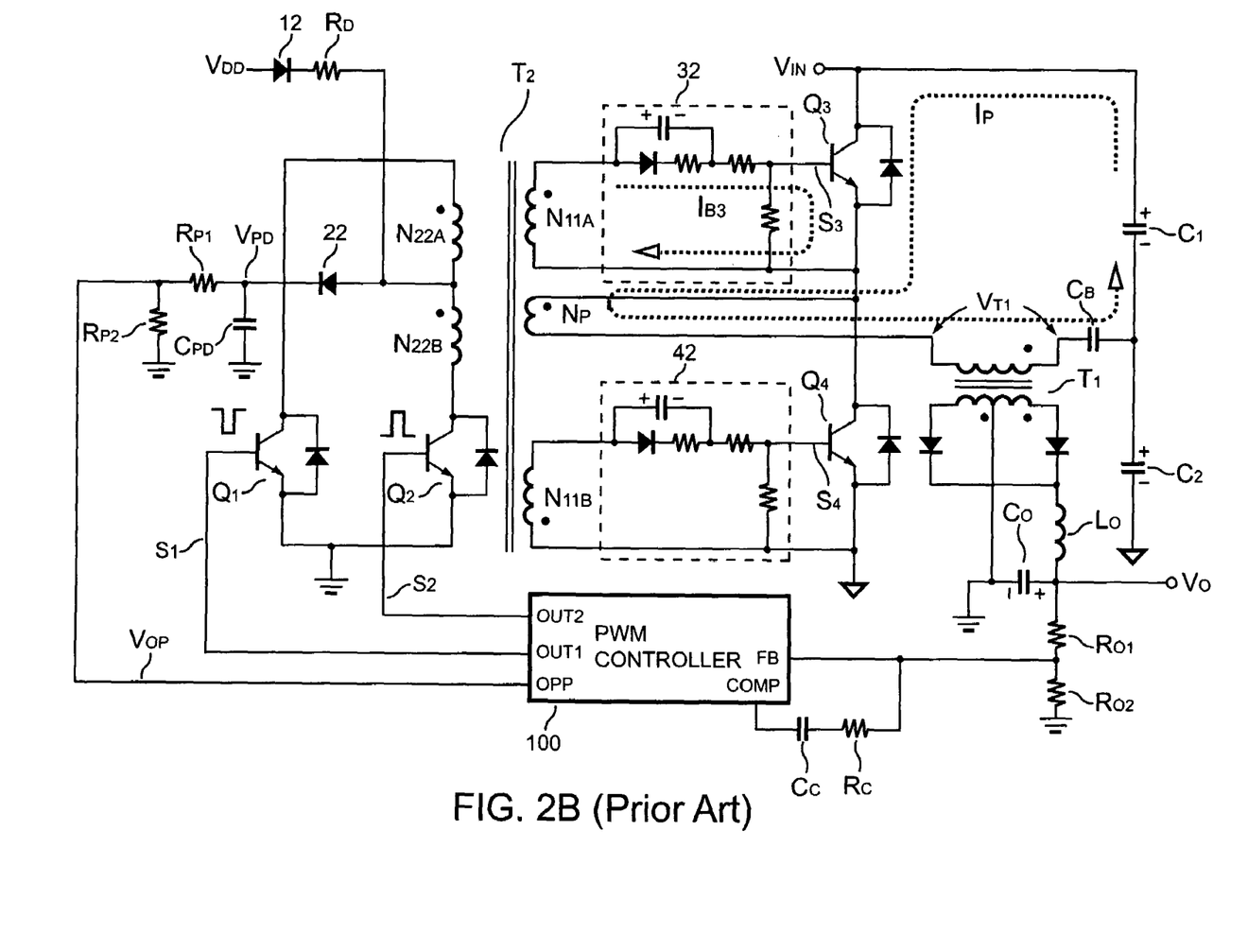
FIG. 2B shows a schematic circuit diagram of conventional self-excited half-bridge power converter during energy transferring.

FIG. 2B illustrates a schematic diagram of conventional self-excited half-bridge power converter during energy transferring. The upper power transistor $Q_3$ is a high voltage transistor with smaller current gain $h_{fe}$ and it needs larger base current $I_B$ to be driven. The driving transformer $T_2$ having current transformer behavior achieves the self-excited driving. The detecting winding $N_P$ of the driving transformer $T_2$ is used for detecting the primary-side current $I_P$ of the main transformer $T_1$. Through the turn ratio of the winding $N_{11A}$ and the detecting winding $N_P$, we can get:

$$I_B = I_P \times \frac{N_{11A}}{N_P} \quad (1)$$

The winding $N_{11A}$ is proportional to the detecting winding $N_P$. The primary-side current $I_P$ flows through the detecting winding $N_P$ so that the larger current $I_B$ is obtained then the base current $I_B$ generates the larger primary-side current $I_P$. The upper power transistor $Q_3$ is totally turned on by such positive feedback mechanism. Referring FIG. 3, the switching signal $S_3$ is at high level and the base current $I_{B3}\times h_{fe}>I_P$. Thus the main transformer $T_1$ delivers the stored energy to the output of the self-excited half-bridge power converter.

Moreover, the winding $N_{11B}$ induces negative voltage and the lower power transistor $Q_4$ is off due to the different polarity of the winding $N_{22B}$ and $N_{11B}$ of the driving transformer $T_2$. The circulating direction of the primary-side current $I_P$ is from the positive terminal of the regulating capacitor $C_1$ to the upper power transistor $Q_3$ then through the detecting winding $N_P$ of the driving transformer $T_2$ to the main transformer $T_1$. The primary-side current $I_P$ further passes the blocking capacitor $C_B$ and then turns back to the negative terminal of the regulating capacitor $C_1$. The stored energy in the input is transformed to the output by the main transformer $T_1$.

In addition, the detecting winding $N_P$ of the driving transformer $T_2$ is not only detecting the primary-side current $I_P$ but also having the output current information to limit the output current. Through the filtering diode 22 and the filtering capacitor $C_{PD}$, we can get an over-power detecting voltage $V_{PD}$:

$$V_{PD} = V_B \times \frac{N_{22}}{N_{11}} = I_P \times \frac{N_{11}}{N_P} \times Z_B \times \frac{N_{22}}{N_{11}} \quad (2)$$

The $V_B$ is the voltage across the winding $N_{11A}$ or $N_{11B}$; the winding $N_{11}$ is the winding $N_{11A}$ or $N_{11B}$; the winding $N_{22}$ is the winding $N_{22A}$ or $N_{22B}$; the $Z_B$ is the input impedance of the upper power transistor $Q_3$ and the lower power transistor $Q_4$. We can get the over-power signal $V_{OP}$ from the over-power detecting voltage $V_{PD}$ through the voltage divider $R_{P1}$ and $R_{P2}$.

Figure 2C:
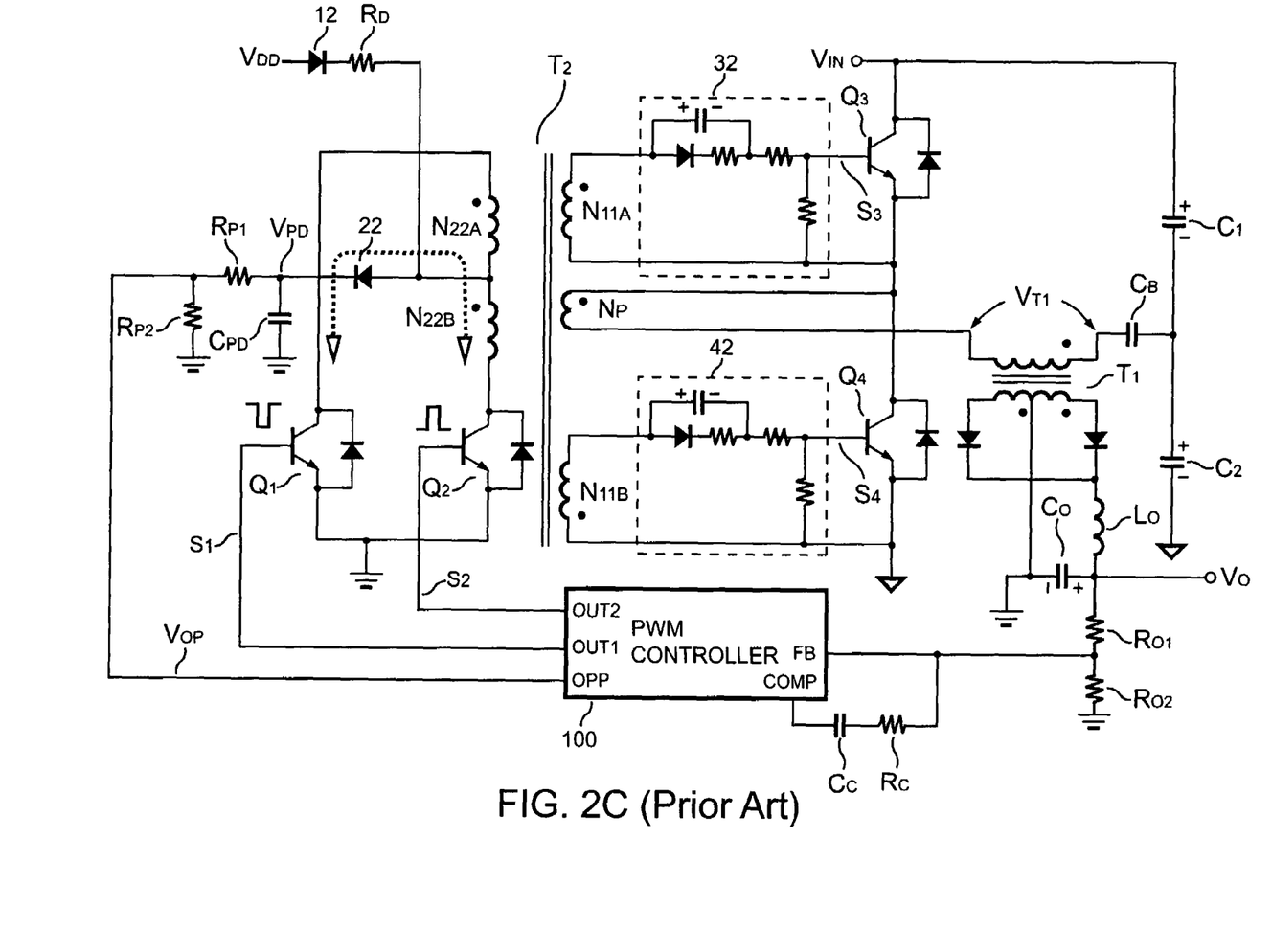
FIG. 2C shows a schematic circuit diagram of conventional self-excited half-bridge power converter during free-wheeling.

Referring to FIG. 3 and FIG. 2C, a schematic diagram of the conventional self-excited half-bridge power converter during the freewheeling, when the PWM controller 100 generates a logic high of the switching signal $S_2$ and $S_1$ that make transistor $Q_1$ and $Q_2$ on, the winding $N_{22A}$ and $N_{22B}$ of the driving transformer $T_2$ are short circuit. Thus the winding $N_{11A}$ and $N_{11B}$ cannot induce the base current $I_B$ and the detecting winding $N_P$ also cannot detect the primary-side current $I_P$. Therefore, the upper power transistor $Q_3$ and the lower power transistor $Q_4$ are off. Referring to FIG. 3, the switching signal $S_3$ and $S_4$ are low level. The main transformer $T_1$ cannot deliver the power to the output of the self-excited half-bridge power converter.

Figure 2D:
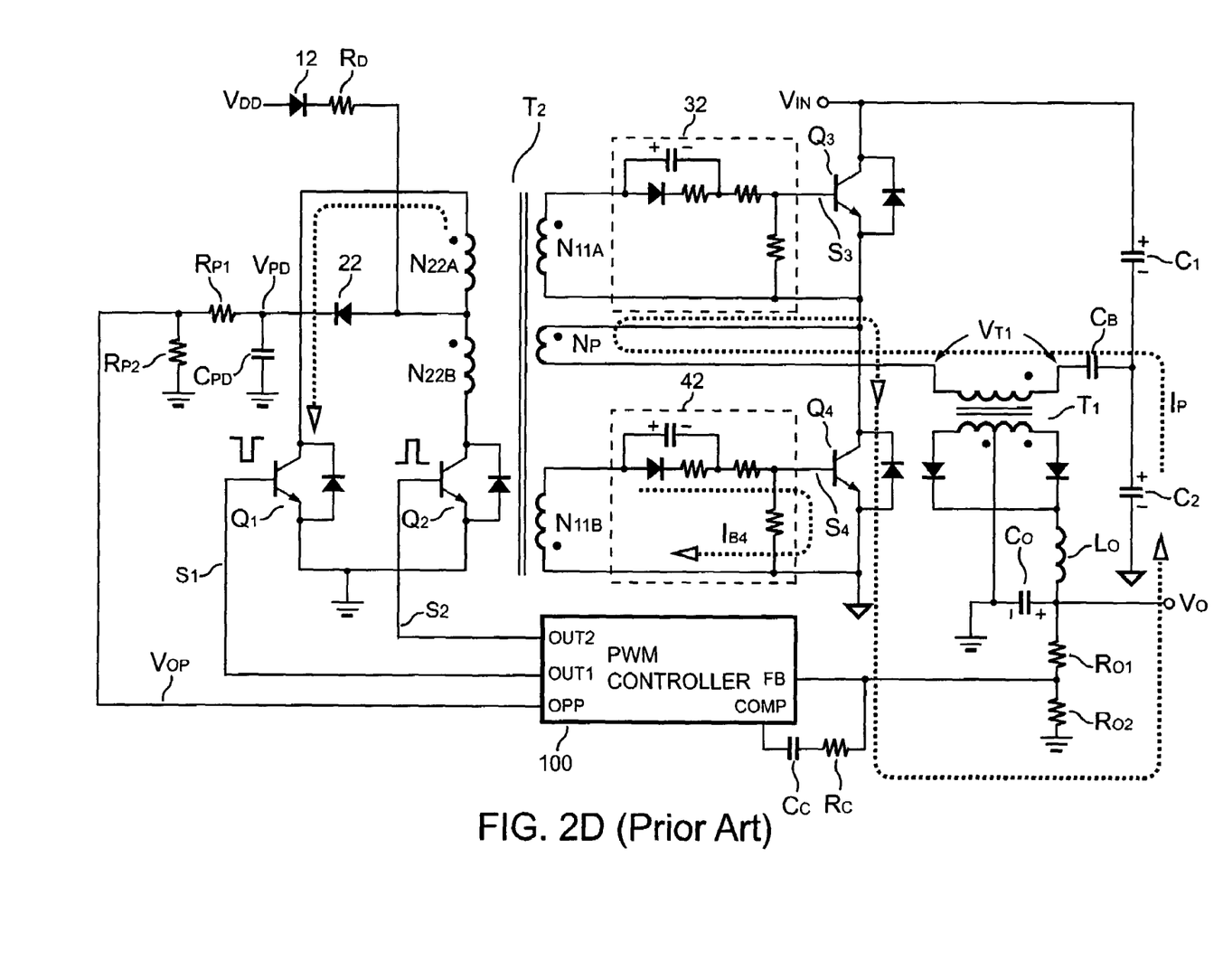
FIG. 2D shows a schematic circuit diagram of conventional self-excited half-bridge power converter during energy transferring.

Referring to FIG. 3, and FIG. 2D, a schematic diagram of the conventional self-excited half-bridge power converter during the energy transferring, the transistor $Q_1$ is on as the PWM controller 100 outputs a high-level switching signal $S_1$. Since the polarity of winding $N_{22A}$ and $N_{11B}$ of the driving transformer $T_2$ is the same, the winding $N_{11B}$ induces the positive voltage for generating the base current $I_{B4}$. Through the turn ratio of the winding $N_{11B}$ and the detecting winding $N_P$, the larger base current $I_{B4}$ is obtained. Thus the lower power transistor $Q_4$ is totally turned on. Referring to FIG. 3, the switching signal $S_4$ is high level and the base current $I_{B4} \times h_{fe} > I_P$ and the main transformer $T_1$ delivers the stored energy to the output of the self-excited half-bridge power converter.

Furthermore, the winding $N_{11A}$ induces a negative voltage and the upper power transistor $Q_3$ is off due to different polarity the winding $N_{22A}$ and $N_{11A}$ of the driving transformer $T_2$. The switching signal $S_3$ is at low level and the lower power transistor $Q_4$ is on. Thus the circulating direction of the primary-side current $I_P$ is from the positive terminal of the regulating capacitor $C_2$ to the blocking capacitor $C_B$ then through the main transformer $T_1$ to the detecting winding $N_P$ of the driving transformer $T_2$. Next the primary-side current $I_P$ further passes the lower power transistor $Q_4$ and then back to the negative terminal of the regulating capacitor $C_2$. Therefore, the stored energy in the input is delivered to the output by the main transformer $T_1$.

Referring to FIG. 3, the switching signal $S_2$ is for the start-up signal in the PWM controller 100 of the conventional self-excited half-bridge power converter. The switching signal $S_1$ is also for the start-up signal in the PWM controller 100 of the conventional self-excited half-bridge power converter. The switching signal $S_2$ is at low level.

Figure 4:
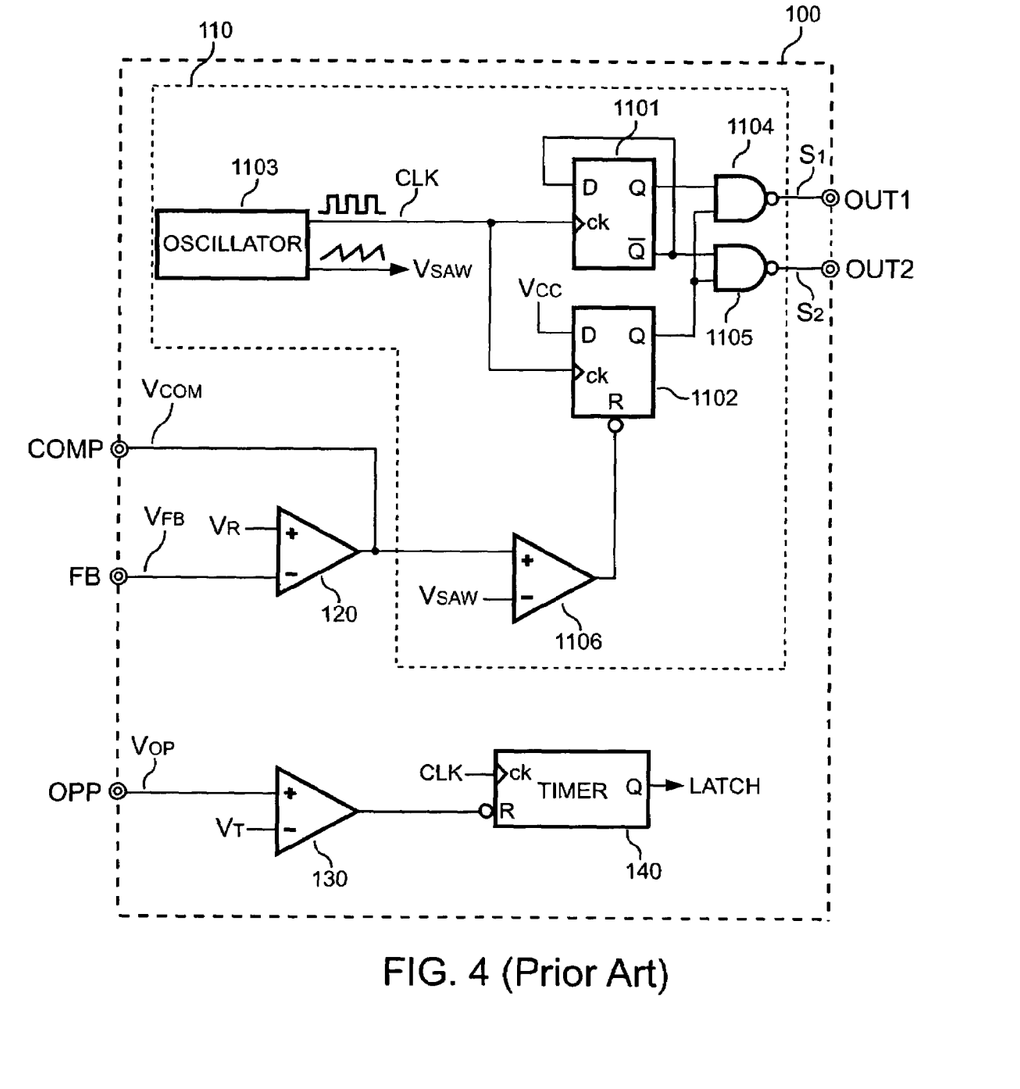
FIG. 4 shows a schematic circuit diagram of a PWM controller of the conventional self-excited half-bridge power converter.

A schematic diagram of the PWM controller of the conventional self-excited half-bridge power converter is shown in FIG. 4. The PWM controller 100 comprises a PWM unit 110, an error amplifier 120, a comparator 130 and a timer 140. The PWM unit 110 further comprises two D flip-flop 1101 and 1102, an oscillator 1103, two NAND gates 1104, 1105, and a comparator 1106. The oscillator 1103 generates a saw-toothed signal $V_{SAW}$ and a clock signal CLK. The saw-toothed signal $V_{SAW}$ determines the switching frequency of the switching signal $S_1$ and $S_2$. The positive input of the error amplifier 120 is coupled to a reference voltage $V_R$. The negative input of the error amplifier 120 is coupled to a feedback terminal $F_B$ for generating a compensating signal $V_{COM}$ in response to a feedback signal $V_{FB}$. The positive of the comparator 1106 is coupled to the output of the error amplifier 120 in response to the compensating signal $V_{COM}$. The negative of the comparator 1106 is coupled to the oscillator 1103 in response to the saw-tooth signal $V_{SAW}$. The output of the comparator 1106 through D flip-flop 1101, 1102 and two NAND gates 1104, 1105 determines the pulse width of the switching signal $S_1$ and $S_2$.

For the sake of safety reasons, an over-power protection must be provided to protect both power converter itself and the system power. A limited output power is thus required for a power converter under the overload and short circuit conditions. The primary-side current $I_P$ is used to detect the output current. The over-power signal $V_{OP}$ will raise in response to the increase of the output current, the power and the primary-side current $I_P$ once the overload and short circuit conditions are happened.

The output of the comparator 130 and the reset input of the timer 140 are in a high level via comparison of the comparator 130 when the over-power signal $V_{OP}$ is higher than the threshold signal $V_T$. In the meantime, the timer 140 starts to count. After a period of the delay time $T_d$, the output of the timer 140 will produce a high-level latch signal LATCH that makes the switching signal $S_3$ and $S_4$ off through the internal protection circuit of the PWM controller. The object of the delay time $T_d$ is to avoid the fault condition caused by immediately load change. The delay time $T_d$ needs to be larger than the response time of dynamic load.

The output voltage $V_O$ and the feedback signal $V_{FB}$ from feedback terminal FB are reduced when the output of the self-excited power converter is short. Because the reference voltage $V_R$ is a constant voltage and the voltage difference between the feedback signal $V_{FB}$ and the reference voltage $V_R$ is too large so that the error amplifier 120 will output a larger compensating signal $V_{COM(A)}$ to the comparator 1106 to amplify the feedback signal $V_{FB}$ and reference voltage $V_R$. The compensating signal $V_{COM}$ increases to $V_{COM(A)}$. The output power will raise, and the compensating signal $V_{COM}$ also increases to $V_{COM(A)}$ when the over-load is happened. The output of the comparator 1106 through D flip-flop 1101, 1102 and two NAND gates 1104, 1105 generates the switching signal $S_{1(A)}$ and $S_{2(A)}$ in accordance with the compensating signal $V_{COM(A)}$ and the sawtooth signal $V_{SAW}$.

We know that from FIG. 3 it will generates the switching signal $S_{3(A)}$ and $S_{4(A)}$ with larger pulse width and increase the duty cycle of the upper power transistor $Q_3$ and the lower power transistor $Q_4$ when the pulse width of the switching signal $S_{1(A)}$ and $S_{2(A)}$ is smaller than the pulse width of the switching signal $S_1$ and $S_2$. In the meantime, the voltage waveform of the voltage $V_{T1}$ across the main transformer $T_1$ will transfer to the voltage waveform of the voltage $V_{T1(A)}$. The duty cycle of the voltage $V_{T1(A)}$ across the main transformer $T_1$ is larger than the duty cycle of the voltage $V_{T1}$ and this situation will prolong until the end of the delay time $T_d$. The power switch of the power supply sustaining very large voltage and current stress is easy to get damage because it is difficult to control the over-power protection during the delay time $T_d$.

As described above, the objective of the present invention is to provide an over-power protection apparatus for the self-excited power converter. Therefore, the constant current control and cycle-by-cycle current limit is achieved by the over-power protection apparatus to solve the above-mentioned question.

SUMMARY OF THE INVENTION

An object of the present invention is to provide an over-power protection apparatus for self-excited power converter. The duty cycle of the upper and lower transistor is reduced by reducing the compensating signal so as to restrict the cycle-by-cycle current and the maximum output power once the output of the self-excited power converter is short and over-load.

The present invention proposes an over power protection apparatus for a self-excited power converter composed of a soft-start unit for generating a compensating signal in response to a feedback signal of the self-excited power converter, and a PWM unit generating a switching signal in response to the compensating signal while the switching signal controls the output power of the self-excited power converter. Moreover, the soft-start unit is coupled to an adjusting unit that receives an over-power signal and a second threshold signal of the self-excited power converter. The adjusting unit drives the soft-start unit and further drives the PWM unit to modulate the switching signal for reducing the output power of said self-excited power converter when the short circuit and the over-load are happened in the output of the self-excited power converter and the over-power signal is higher than the second threshold signal. A timing unit receives the over-power signal and a first threshold signal of the self-excited power converter. The timing unit starts to count once the over-power signal is higher than the first threshold signal. After counting for a period of time, the timing unit generates a latch signal so as to make the self-excited power converter stop supplying power source.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DETAILED DESCRIPTION OF THE PREFERRED EMBODIMENTS

Figure 5:
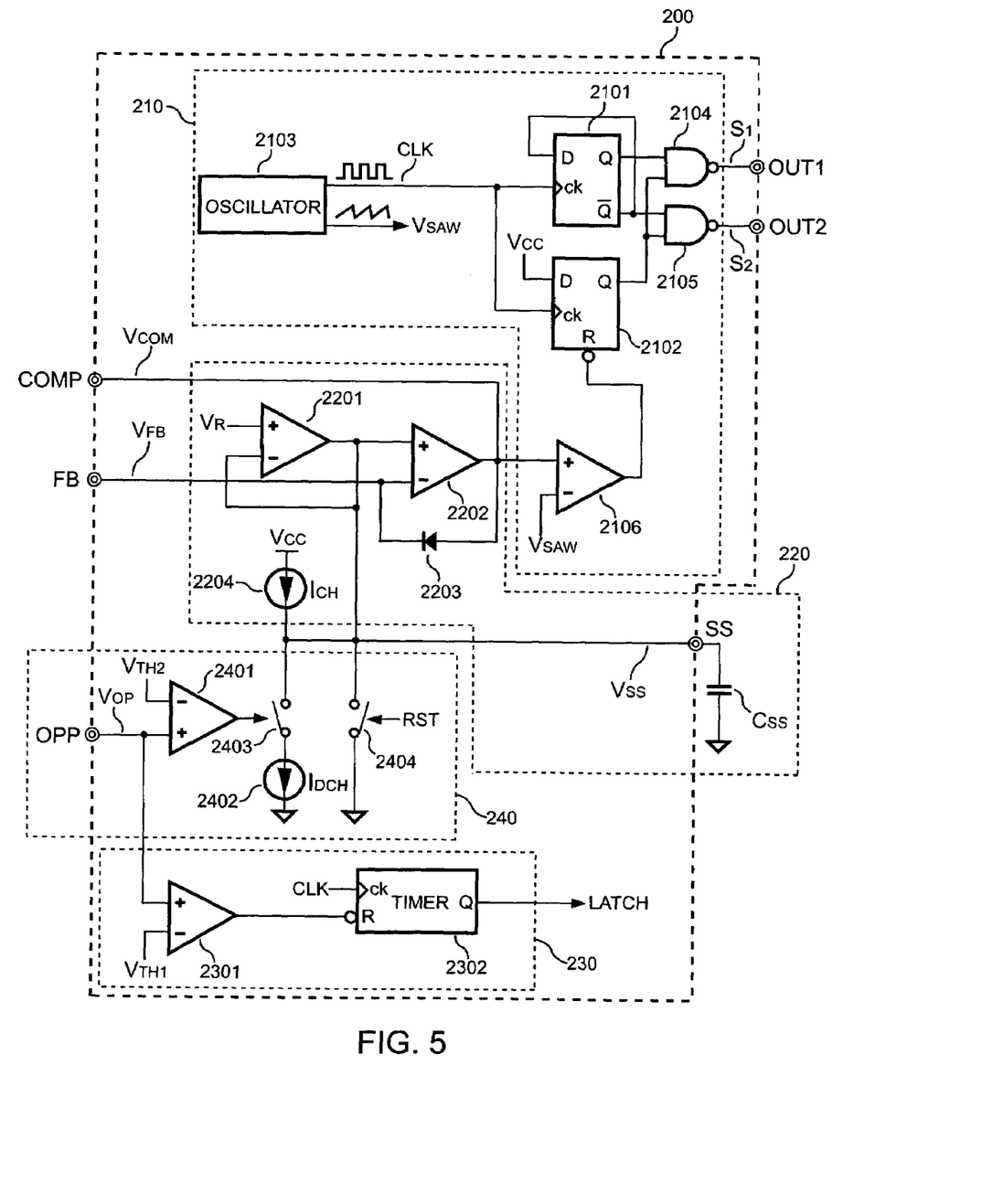
FIG. 5 shows a schematic circuit diagram of a PWM controller of the self-excited power converter according to the present invention.

FIG. 5 shows a schematic diagram of a PWM controller of the self-excited power converter according to the present invention. An over-power protection apparatus is coupled to a PWM unit 210 of a PWM controller 200 and it can build-in or not build-in the PWM controller 200 of the self-excited power converter. The over-power protection apparatus in accordance with the present invention includes a soft-start unit 220, a timing unit 230 and an adjusting unit 240. The soft-start unit 220 consists of an operation amplifier 2201, an error amplifier 2202, a clamp diode 2203 and a charging unit that includes a first power source 2204 as well as a start-up capacitor $C_{SS}$. The first power source 2204 is coupled to the start-up capacitor $C_{SS}$ for charging the start-up capacitor $C_{SS}$.

The positive input of the operation amplifier 2201 receives a reference voltage $V_R$. The negative input of the operation amplifier 2201 is coupled to the output of the operation amplifier 2201 and the start-up capacitor $C_{SS}$. Such a connection forms a unit gain buffer and acts as a regulating unit when the output of the operation amplifier 2201 generates the start-up voltage $V_{SS}$. The positive input of the error amplifier 2202 connects to the start-up capacitor $C_{SS}$ and the output of the operation amplifier 2201 in response to the start-up voltage $V_{SS}$. The negative input of the error amplifier 2202 connects to a feedback terminal FB of the self-excited power converter in response to the feedback signal $V_{FB}$. The output of the error amplifier 2202 is connected to the PWM unit 210. The error amplifier 2202 receives the start-up voltage $V_{SS}$ and the feedback signal $V_{FB}$ for generating the compensating signal $V_{COM}$. The clamp diode 2203 is connected between the negative input and the output of the error amplifier 2202 for clamping the voltage level of the compensating signal $V_{COM}$ as the self-excited power converter is started up.

The PWM unit 210 comprises two D flip-flop 2101 and 2102, an oscillator 2103, two NAND gates 2104 and 2105, and a comparator 2106. The oscillator 2103 generates a clock signal CLK and a saw-toothed signal $V_{SAW}$ for determining the switching frequency of the switching signal $S_1$ and $S_2$. A positive input of the comparator 2106 couples to the output of the error amplifier 2202 of the soft-start unit 220 for receiving the compensating signal $V_{COM}$. A negative input of the comparator 2106 is connected to the oscillator 2103 for receiving the saw-toothed signal $V_{SAW}$. The output of the comparator 2106 through D flip-flop 2101, 2102 and two NAND gates 2104, 2105 determines the pulse width of the switching signal $S_1$ and $S_2$.

The first power source 2204 charges the start-up capacitor $C_{SS}$ and the start-up voltage $V_{SS}$ across the start-up capacitor $C_{SS}$ starts to increase from zero as the self-excited power converter is started up. The operation amplifier 2201 is a unit-gain buffer and the maximum value of the start-up voltage $V_{SS}$ is the reference voltage $V_R$ in the normal operation. The output of the error amplifier 2202 is clamped at the on-state voltage drop $V_F$ (about 0.7V) of the clamping diode 2203 because that the positive input of the error amplifier 2202 is zero and the clamping diode 2203 has a voltage clamped characteristic as the self-excited power converter is started up. After this, the compensating signal $V_{COM}$ from the output of the error amplifier 2202 is gradually increased along with the increase of the start-up voltage $V_{SS}$ from the positive input of the error amplifier 2202. Thus the pulse width of the switching signal $S_1$ and $S_2$ will vary along with the change the start-up voltage $V_{SS}$ until the start-up voltage $V_{SS}$ reach to the reference voltage $V_R$ in the charging process. In the meantime, the pulse width of the switching signal $S_1$ and $S_2$ arrives at a predetermined value and the output voltage $V_O$ of the self-excited power converter will rise as the start-up voltage $V_{SS}$ increases. Finally, the output voltage $V_O$ has been built up and the soft-start function is achieved.

The first power source 2204 as the above-mentioned is a current source to provide a charging current for the start-up capacitor $C_{SS}$ as the self-excited power converter is started up. The first power source 2204 charges the start-up capacitor $C_{SS}$ to cause the increase of the start-up voltage $V_{SS}$ and the output voltage $V_O$ of the self-excited power converter. The start-up capacitor $C_{SS}$ is used to program the start-up time of the self-excited power converter by its capacitance. The larger start-up capacitor $C_{SS}$ will increase the start-up time and reduce the voltage as well as current rating of the power switch. Thus by properly selecting the capacitance of the start-up capacitor $C_{SS}$, the delay time in the desirable range can be achieved as the self-excited power converter is started up.

Further referring to FIG. 5, the timing unit 230 comprises a first comparator 2301 and a timer 2302. The positive input and the negative input of the first comparator 2301 receive the over-power signal $V_{OP}$ and the first threshold signal $V_{TH1}$ respectively. The output of the first comparator 2301 is coupled to the reset input of the timer 2302. The output of the first comparator 2301 and the reset input of timer 2302 are low level once the over-power signal $V_{OP}$ is lower than the first threshold signal $V_{TH1}$, and in the meantime the timer 2302 does not count. The output of the timer 2302 generating the latch signal LATCH is low level so that the self-excited power converter keeps normal operation.

The output current and output power are increased dramatically once short circuit and over-power are happened in the output of the self-excited power converter. The primary current $I_P$ in proportion to the output current is also increased to cause the increase of the over-power signal $V_{OP}$. The output of the first comparator 2301 and the reset input of the timer 2302 are logic high once the over-power signal $V_{OP}$ is over the first threshold signal $V_{TH1}$. At this time, the timer 2302 starts to count. After a period of the delay time $T_d$, the latch signal LATCH at the output of the timer 2302 is high level. Thus through the internal protection circuit in the PWM controller, the upper power transistor $Q_3$ and the lower power transistor $Q_4$ are turned off. The main transformer $T_1$ does not generate energy to the output of the self-excited power converter so that the self-excited power converter stops supplying power source.

Further referring to FIG. 5, an adjusting unit 240 comprises a second comparator 2401, a second power source 2402 and a first switch 2403. The positive input and the negative input of the second comparator 2401 receive the over-power signal $V_{OP}$ and the second threshold signal $V_{TH2}$ respectively. The second power source 2402 is connected between the first switch 2403 and a ground reference while the first switch 2403 is connected to the first power source 2204 and the start-up capacitor $C_{SS}$.

The over-power signal $V_{OP}$ is increased once short circuit and over-load are happened in the output of the self-excited power converter. The timer 2302 starts to count once the over-power signal $V_{OP}$ is over the first threshold signal $V_{TH1}$. If the over-power signal $V_{OP}$ is also over the second threshold signal, through the comparison and operation of the second comparator 2401, the output of the second comparator 2401 is high level so as to make the first switch 2403 turn on. Thus the start-up capacitor $C_{SS}$ is discharged by the second power source 2402. The discharging current $I_{DCH}$ of the second power source 2402 is far more higher than the charging current $I_{CH}$ of the first power source 2204 even though the first power source 2204 still charges the start-up capacitor $C_{SS}$. Therefore, the start-up voltage $V_{SS}$ discharges quickly as shown in FIG. 6.

Figure 6:
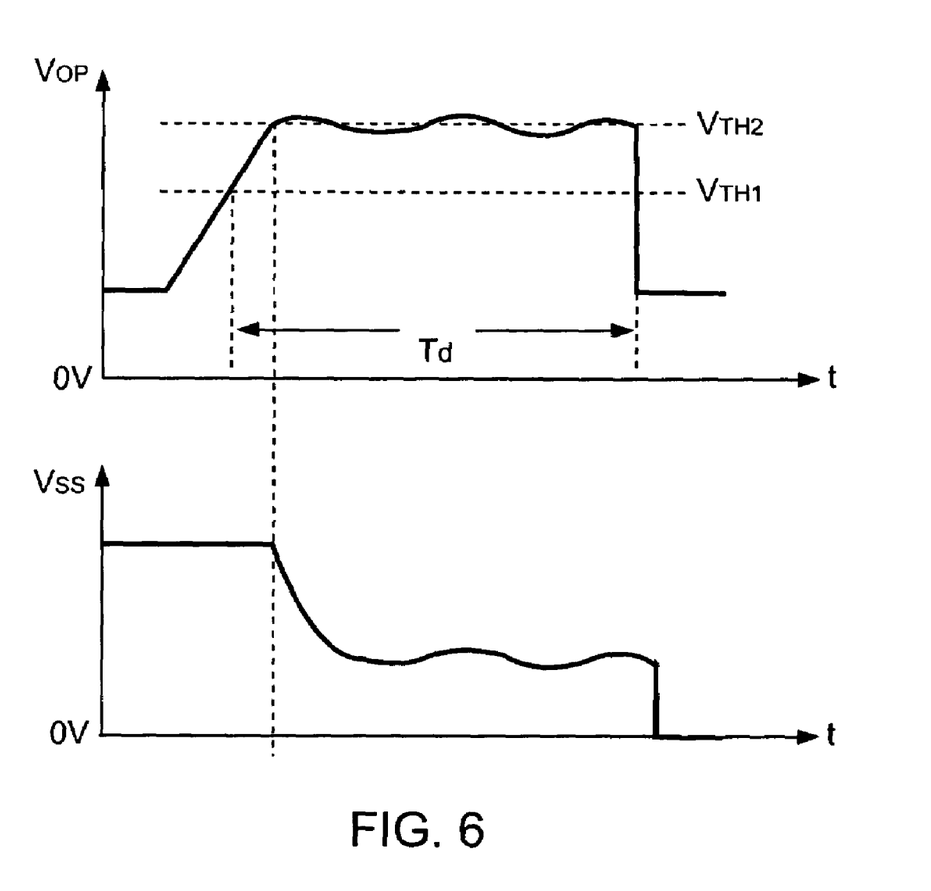
FIG. 6 shows the waveform of the start-up voltage $V_{SS}$ and the over-power signal $V_{OP}$ of the over-power protection apparatus of the self-excited power converter according to the present invention.
Figure 7:
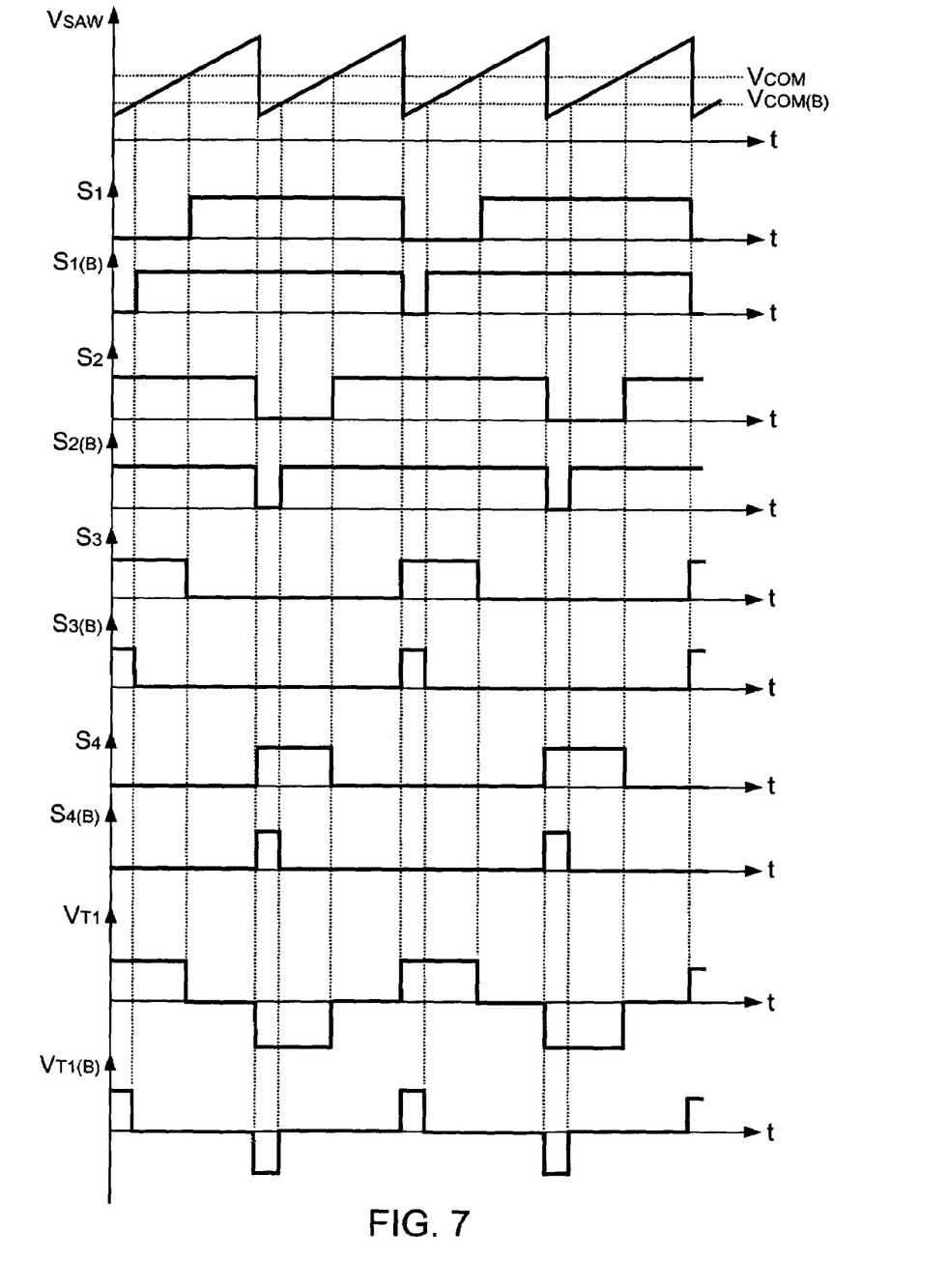
FIG. 7 shows a waveform of the over-power protection apparatus of the self-excited power converter according to the present invention.

Referring to FIG. 6, the self-excited power converter generates the time delay through feedback loop compensation. The over-power signal $V_{OP}$ will continue for a while when the over-power signal $V_{OP}$ exceeds the second threshold signal $V_{TH2}$. At this time, the start-up voltage $V_{SS}$ is decreased and the timer 2302 is still counting. The error amplifier 2202 generates the compensating signal $V_{COM(B)}$ due to the decrease of the start-up voltage $V_{SS}$ as shown in FIG. 7. In this figure, the magnitude of the compensating signal $V_{COM(B3)}$ is smaller than the magnitude of the compensating signal $V_{COM}$. Thus the NAND gate 2104 and 2105 provide the switching signal $S_{1(B)}$ and $S_{2(B)}$ with larger pulse width and further the switching signal $S_{3(B)}$ and $S_{4(B)}$ having smaller pulse width via the comparator 2106 to reduce the duty cycle of the upper power transistor $Q_3$ and lower power transistor $Q_4$. The over-power signal $V_{OP}$ is decreased in response to the reduced duty cycle of the voltage $V_{T1(B)}$ across the main transformer $T_1$.

The discharging of the start-up capacitor $C_{SS}$ is finished once the over-power signal $V_{OP}$ decreases to be lower than the second threshold signal $V_{TH2}$ so that the start-up voltage $V_{SS}$ keeps a low voltage level. Meanwhile, the over-power signal $V_{OP}$ is still higher than the first threshold signal $V_{TH1}$ and the timer 2302 also still counting. The second comparator 2401 is disabled and the first switch 2403 is off as the over-power signal $V_{OP}$ decreases to be lower than the second threshold signal $V_{TH2}$. Then the first power source 2204 further starts to charge the start-up capacitor $C_{SS}$ and the start-up voltage $V_{SS}$ rises from a lower voltage level. The duty cycle of the start-up voltage $V_{SS}$ rises slowly to cause the duty cycle of the upper power transistor $Q_3$ and the lower power transistor $Q_4$ also increasing slowly. Therefore, the over-power signal $V_{OP}$ is over the second threshold signal $V_{TH2}$ again.

Moreover, the output of the second comparator 2401 is at high level and the first switch 2403 is on. The start-up capacitor $C_{SS}$ is discharged by the second power source 2402 and the cycle of the charge and discharge is repeated after a period of the delay time $T_d$. Then the latch signal LATCH at the output of the timer 2302 is at high level. The upper power transistor $Q_3$ and the lower power transistor $Q_4$ are totally turned off through the internal protection circuit in the PWM controller.

The compensating signal $V_{COM}$ is increased in response to the reduced output voltage $V_O$ and the lowered feedback signal $V_{FB}$ received by the feedback terminal FB when the output of the self-excited power converter is short-circuited. The compensating signal $V_{COM}$ is also increased in response to the raised output power once the output of the self-excited power converter is over-power.

The over-power protection apparatus according to present invention reduces the start-up voltage $V_{SS}$ in accordance with the increase of the over-power signal $V_{OP}$ and the discharging of the start-up capacitor $C_{SS}$. The error amplifier 2202 outputs a smaller compensating signal $V_{COM(B)}$ to the comparator 2106. The compensating signal $V_{COM}$ decreases to $V_{COM(B)}$. The compensating signal $V_{COM(B)}$ and the saw-toothed signal $V_{SAW}$ generate the switching signal $S_{3(B)}$ and $S_{4(B)}$ having a smaller pulse width through the comparator 2106, D flip-flop 2101, 2102 and NAND gate 2104, 2105 so that the duty cycle of the upper power transistor $Q_3$ as well as the lower power transistor $Q_4$ and the duty cycle of the voltage $V_{T1(B)}$ of the main transformer $T_1$ are all reduced until the end of the delay time $T_d$.

During the delay time $T_d$, the over-power protection mechanism has been started, in the meantime, the cycle-by-cycle current and the maximum output power are restricted. The over-power protection apparatus according to the present invention can avoid to output an over compensating signal $V_{COM}$ and an over output power once short circuit and over-power are happened in the output of the self-excited power converter. Furthermore, the upper power transistor $Q_3$ and the lower power transistor $Q_4$ with lower voltage and lower current rating are used in the present invention so that the circuit cost is reduced.

Further referring to FIG. 5, the adjusting unit 240 further comprises a second switch 2404 that connects between the start-up capacitor $C_{SS}$ and the ground reference. The second switch 2404 is coupled to the start-up capacitor $C_{SS}$ in parallel and is controlled by a reset signal RST for discharging the start-up capacitor $C_{SS}$. When the self-excited power converter does not generate the output power, the soft-start unit 220 according to the present invention senses the feedback signal $V_{FB}$ from the feedback terminal FB and produces the reset signal RST via the internal protection circuit in the PWM controller 200. The reset signal RST is used for discharging the start-up capacitor $C_{SS}$ and decreasing the start-up voltage $V_{SS}$ rapidly to reduce the voltage level of the compensating signal $V_{COM}$.

Owing to rapidly reduction of the compensating signal $V_{COM}$, the compensating signal $V_{COM}$ and the saw-toothed signal $V_{SAW}$ will output the switching signal having a minimum pulse width through the comparator 2106 to decrease the duty cycle of the upper power transistor Q3 and the lower power transistor $Q_4$. The duty cycle of the voltage $V_{T1}$ across the main transformer $T_1$ is also reduced. Transistors $Q_1$ and $Q_2$ are totally turned on when the start-up voltage $V_{SS}$ continues decreasing and the compensating signal $V_{COM}$ also reduces to be lowered than the saw-tooth signal $V_{SAW}$ so that the upper power transistor $Q_3$ and the lower power transistor $Q_4$ are nearly totally turned off. Therefore, the reset function and proper protection for the self-excited power converter is achieved.

As described above, an over-power protection apparatus for the self-excited power converter in accordance with the present invention provides a proper protection under the overload and short circuit conditions.

The adjusting unit 240 can reduce the start-up voltage of the start-up capacitor and further reduce the compensating signal once the short circuit and over load are happened at the output of the self-excited power converter. Thus the duty cycle of the upper power transistor, the lower power transistor and the voltage across the main transformer are reduced. Therefore, the cycle-by-cycle current and the maximum output power are restricted.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. An over-power protection circuit for a self-excited power converter, comprising:
   a soft-start unit, generating a compensating signal in response to a feedback signal of said self-excited power converter, a PWM unit of said self-excited power converter generating a switching signal in response to said compensating signal, wherein said switching signal controls the output power of said self-excited power converter;
   an adjusting unit, coupled to said soft-start unit in response to an over-power signal and a second threshold signal of said self-excited power converter, wherein said adjusting unit drives said soft-start unit and said PWM unit to modulate said switching signal for reducing the output power of said self-excited power converter once said over-power signal is higher than said second threshold signal; and
   a timing unit, receiving said over-power signal and a first threshold signal of said self-excited power converter, wherein said timing unit starts to count once said over-power signal is higher than said first threshold signal while said timing unit generates a latch signal to make said self-excited power converter stop supplying power source after the timing unit counting for a period of time.

2. The over-power protection circuit for a self-excited power converter of claim 1, wherein said soft-start unit further comprising:
   a charging unit, generating a start-up voltage;
   a regulating unit, coupled to said charging unit for regulating voltage;
   an error amplifier, with a positive input coupled to said charging unit and said regulating unit for receiving said start-up voltage, a negative input coupled to receive said feedback signal of said self-excited power converter; the output of said error amplifier generating said compensating signal; and
   a clamp diode, coupled between the output and the negative input of said error amplifier.

3. The over-power protection circuit for a self-excited power converter of claim 2, wherein said regulating unit is a unit gain buffer or an operation amplifier; the positive input of said operation amplifier receives a reference voltage and the negative input of said operation amplifier is coupled to the output of said operation amplifier and said charging unit in response to said start-up voltage; the output of said operation amplifier is coupled to the positive input of said error amplifier.

4. The over-power protection circuit for a self-excited power converter of claim 2, wherein said charging unit comprises a first power source and a start-up capacitor; said first power source is coupled to said start-up capacitor for charging said start-up capacitor to generate said start-up voltage.

5. The over-power protection circuit for a self-excited power converter of claim 2, wherein said adjusting unit that drives said soft-start unit and said PWM unit to modulate said switching signal comprising:
   a second power source coupled to a ground reference;
   a first switch, coupled between said charging unit and said second power source;
   a second comparator, with a positive input for receiving said over-power signal of said self-excited power converter, a negative input coupled to receive said second threshold signal of said self-excited power converter, wherein the output of said second comparator outputs a signal to turn on said first switch for discharging said charging unit to reduce said start-up voltage once said over-power signal is higher than said second threshold signal.

6. The over-power protection circuit for a self-excited power converter of claim 5, wherein said adjusting unit further comprises a second switch coupled between said charging unit and said ground reference; said second switch is on so that said charging unit is discharging for reducing said start-up voltage in response to a reset signal.

7. The over-power protection circuit for a self-excited power converter of claim 1, wherein said timing unit comprises a first comparator and a timer coupled with each other while a positive input of said first comparator receives said over-power signal of said self-excited power converter and a negative input of said first comparator receives said first threshold signal of said self-excited power converter; said first comparator outputs a high level signal to said timer so that said timer starts counting once said over-power signal is higher than said first threshold signal.

8. The over-power protection circuit for a self-excited power converter of claim 1, wherein said adjusting unit drives said soft-start unit for reducing the voltage level of said compensating signal as well as the output power of said self-excited power converter once said over-power signal is higher than said second threshold signal.

9. The over-power protection circuit for a self-excited power converter of claim 1, wherein said over-power protection circuit is disposed in a PWM controller of said self-excited power converter.

* * * * *